US012521032B2

(12) United States Patent
Lichy et al.

(10) Patent No.: US 12,521,032 B2
(45) Date of Patent: Jan. 13, 2026

(54) MULTIMODAL DETERMINATION OF AN AUGMENTED SEQUENCE OF CT PARAMETER MAPS

(71) Applicant: Siemens Healthcare GmbH, Erlangen (DE)

(72) Inventors: Matthias Lichy, Nuremberg (DE); Bernd Hofmann, Erlangen (DE); Bernhard Schmidt, Fuerth (DE)

(73) Assignee: Siemens Healthineers AG, Forchheim (DE)

( * ) Notice: Subject to any disclaimer, the term of this patent is extended or adjusted under 35 U.S.C. 154(b) by 291 days.

(21) Appl. No.: 18/296,255

(22) Filed: Apr. 5, 2023

(65) Prior Publication Data

US 2023/0320616 A1 Oct. 12, 2023

(30) Foreign Application Priority Data

Apr. 8, 2022 (EP) .................................... 22167439

(51) Int. Cl.
*G06K 9/00* (2022.01)
*A61B 5/055* (2006.01)
(Continued)

(52) U.S. Cl.
CPC ............ *A61B 5/055* (2013.01); *G06T 7/0012* (2013.01); *G06T 7/11* (2017.01); *G06T 2207/10088* (2013.01)

(58) Field of Classification Search
CPC ................... G06T 2207/10088; G06T 7/0012; G06T 7/11
See application file for complete search history.

(56) References Cited

U.S. PATENT DOCUMENTS

2015/0279084 A1* 10/2015 Deuerling-Zheng ..... G06T 5/50
345/424
2016/0350946 A1* 12/2016 Schieke ................ G06T 11/008
(Continued)

OTHER PUBLICATIONS

Van Beers, Bernard et al: "Hepatic Perfusion Parameters in Chronic Liver Disease: Dynamic CT Measurements Correlated with Disease Severity"; Internet AJR, Bd. 176; März 2001; pp. 667-687; XP055957492; Gefunden im Internet: URL:https://www.ajronline.org/doi/epdf/10. 2214/ajr.176.3.1760667.
(Continued)

*Primary Examiner* — Hadi Akhavannik
(74) *Attorney, Agent, or Firm* — Harness, Dickey & Pierce, P.L.C.

(57) ABSTRACT

A method for determining a quantitative result CT parameter map in a region of interest of an object under examination is described. The method includes acquiring a sequence of quantitative input CT parameter maps for at least two predetermined times, the sequence being generated by a contrast-enhanced spectral multiphase CT of the region of interest; receiving a sequence of contrast-enhanced MRI image datasets, the MRI datasets having a higher temporal resolution than the sequence of input CT parameter maps; determining a relation between the MRI image datasets and the input CT parameter maps; and determining the result CT parameter map based on the determined relation and the MRI image datasets for at least one additional time, the at least one additional time being different from the predetermined time.

21 Claims, 5 Drawing Sheets

(51) Int. Cl.
*G06T 7/00* (2017.01)
*G06T 7/11* (2017.01)

(56) References Cited

U.S. PATENT DOCUMENTS

| | | | |
|---|---|---|---|
| 2018/0276856 A1* | 9/2018 | Schieke | G06V 10/764 |
| 2018/0304099 A1* | 10/2018 | Li | A61B 5/0036 |
| 2018/0374213 A1* | 12/2018 | Arnold | G06N 5/046 |
| 2019/0015061 A1* | 1/2019 | Liebeskind | A61B 6/461 |
| 2019/0053791 A1* | 2/2019 | Frinking | G16Z 99/00 |
| 2022/0087631 A1* | 3/2022 | d'Esterre | A61B 6/507 |
| 2022/0346659 A1* | 11/2022 | Ma | A61B 5/055 |

OTHER PUBLICATIONS

Alvarez, R. E. et al. "Energy-selective reconstructions in X-ray computerised tomography" Physics in Medicine & Biology, vol. 21, No. 5, pp. 733-744, Sep. 1976 // DOI: 10.1088/0031-9155/21/5/002.
Geon-Ho Jahng et al: "Perfusion Magnetic Resonance Imaging: A Comprehensive Update on Principles and Techniques"; Korean Journal of Radiology; Bd. 15, Nr. 5; Sep. 12, 2014; pp. 554; XP055199981; ISSN: 1229-6929; DOI: 10.3348/kjr.2014.15.5.554.
Grant, K.L., et.al.: "Assessment of an Advanced Image-Based Technique to Calculate Virtual Monoenergetic Computed Tomographic Images From a Dual-Energy Examination to Improve Contrast-To-Noise Ratio in Examinations Using Iodinated Contrast Media", in: Investigative Radiology, 2014; 2014.
Kim Se Hyung et al: "CT Perfusion of the Liver: Principles and Applications in Oncology"; Radiology; Bd. 272, Nr. 2, Jul. 24, 2014; pp. 322-344; XP055957489; ISSN: 0033-8419, DOI: 10.1148/radiol.14130091.
Spahr Nadine et al: "Multimodal image registration for liver radioembolization planning and patient assessment"; International Journal of Computer Assisted Radiology and Surgery, Springer, DE; Bd. 14, Nr. 2; Oct. 22, 2018; pp. 215-225; XP037012487; ISSN: 1861-6410; DOI: 10.1007/S11548-018-1877-5.
Yelt, F.Swarapu Venkata R et al: "Top-Level System Designs for Hybrid Low-Field MRI-CT with Potential of Pulmonary Imaging"; Sensing and Imaging: An International Journal, Springer US, Boston, Bd. 15, Nr. 1, Oct. 11, 2014, pp. 1-9 XP035932311; ISSN: 1557-2064; DOI: 10.1007/S11220-014-0098-4.

* cited by examiner

MULTIMODAL DETERMINATION OF AN AUGMENTED SEQUENCE OF CT PARAMETER MAPS

CROSS-REFERENCE TO RELATED APPLICATION(S)

The present application claims priority under 35 U.S.C. § 119 to European Patent Application No. 22167439.3, filed Apr. 8, 2022, the entire contents of which are incorporated herein by reference.

FIELD

One or more example embodiments of the present invention relates to a method for determining a quantitative result CT parameter map in a region of interest of an object under examination. One or more example embodiments of the present invention also relates to a method for acquiring a quantitative result parameter map. One or more example embodiments of the present invention further relates to a parameter determining device. In addition, one or more example embodiments of the present invention relates to a multimodal medical imaging system.

RELATED ART

Modern imaging methods are frequently used to generate two- or three-dimensional image data which can be used to visualize an imaged object under examination and also for further uses. In many cases, imaging methods are based on the acquisition of X-rays, wherein so-called projection measurement data is generated. Projection measurement data can be acquired, for example, using a computed tomography (CT) system.

In CT imaging with spectrally resolved CT data generated e.g. using photon-counting detectors, dual-source CT systems or CT systems with which X-rays with different energy spectra are generated, different CT parameter values can be determined, particularly concentrations of contrast agents in a region of interest (in the specific example of CT, the iodine content in the tissue). Such spectral datasets have already demonstrated their suitability as surrogates for determining vitality and response to treatment in the field of tumor examination and tumor therapy.

Magnetic resonance imaging (MRI) is another form of medical imaging. MRI can be used to generate high-resolution MRI datasets that provide useful information for a number of diseases. Like CT, MRI measures blood flow through organs, tissues and blood vessels and/or visualizes it with the aid of contrast agents. A typical examination is that of the liver. Here, acquisitions are repeated at different times in order to obtain information about the blood flow and anatomy of the organ and any pathologies that may be present.

In order to enable the state of a tumor to be described in a comparable manner, the images must always be acquired in the same perfusion phase, e.g. at the time of maximum perfusion.

When applied to liver perfusion imaging, multiphase CT typically comprises four distinct phases: the native phase, the arterial phase, the parenchymal phase, and the venous phase.

In the native phase, information can be obtained about fatty deposits, as well as calcifications, hemorrhages, and traces of previous contrast agents.

Thereafter, the contrast agent reaches the liver via the hepatic artery. Perfusion defects and hypervascularized tumors in particular become visible in the arterial phase.

In the uptake phase, colloquially described as the portal venous phase, contrast agent also flows into the liver via the portal vein. Due to the stronger contrasting of the parenchyma, hypovascularized tumors (e.g. metastases) can also be readily detected in this phase.

In the venous phase, also often called the parenchymal phase, there is an equal distribution of the contrast agent in the different compartments. Liver lesions with delayed, persistent contrast uptake, such as focal nodular hyperplasia, may become visible in this phase. In still later acquisitions, homogeneous uptake of contrast agent occurs; this is particularly relevant for assessing the extent of necrosis.

Often, however, especially in the case of multiphase CT, the optimal time for a measurement is just missed, which adversely affects the diagnostic value of the imaging in terms of the desired parameter, preferably a parameter that relates to the maximum contrast agent concentration corresponding to maximum blood flow. This problem arises in particular when, in multiphase CT, images are taken at only a small number of points in time (small number of times), e.g. at four points in time (four times), corresponding to the four different phases of perfusion.

In order to achieve the broadest possible time coverage of an organ imaging procedure, non-spectral CT perfusion measurement with a higher temporal resolution is often used in multiphase CT. In this context, spectral CT is to be understood as meaning CT image acquisition in which a differentiation is made between different spectral components of the detected X-rays. With spectral CT image acquisition, conclusions can be drawn regarding the quantity or proportions of different materials or substances in a region of interest. For example, a quantity or location-dependent concentration of contrast agent, bone, calcium, fat or water can be determined.

Non-spectral CT image acquisition, on the other hand, only provides information about the location-dependent attenuation of X-rays in a region of interest, but cannot provide quantitative information regarding the occurrence of different materials and the proportions thereof.

Consequently, the disadvantage of a non-spectral perfusion CT measurement of this kind is that contrast agent, e.g. iodine, cannot be quantified on the basis of the CT image data alone. Physiological data such as blood flow or time to maximal contrast agent uptake can be parameterized with the aid of a pharmacokinetic model. By way of comparison, spectral CT can be used for contrast agent quantification, especially of iodine volume, based on the CT image data alone. In addition, a perfusion CT measurement with high temporal resolution involves a comparatively high radiation exposure and, as a result, a correspondingly reduced image quality for individual points in time compared to classical multiphase CT with only a small number of image acquisitions.

On the other hand, new developments in magnetic resonance imaging allow the acquisition of 3D datasets with high temporal resolution without radiation exposure, in which the optimum point in time of maximum contrast agent volume in a monitored region during organ/tumor perfusion is practically always also acquired. However, similarly to non-spectral perfusion CT, quantification of physiological parameters is only possible with magnetic resonance imaging using a pharmacokinetic model.

SUMMARY

It is often the case that both CT, in the form of multiphase CT, and MRI are performed for a patient and, depending on the therapeutic relevance, are also repeated.

However, as mentioned above, both imaging modalities exhibit the problem of obtaining an absolute contrast agent quantification at an optimal time as a surrogate for, among other things, an assessment of tumor vitality, in particular at a defined time at which a maximum contrast agent volume is present in the region of interest.

This object is achieved by a method for determining a quantitative result CT parameter map in a region of interest of an object under examination as claimed in claim 1, a method for acquiring a quantitative result CT parameter map of a region of interest of an object under examination as claimed in claim 11, a parameter determining device as claimed in claim 12, and a multimodal imaging system as claimed in claim 13.

In particular, the features and advantages described in connection with the methods according to one or more example embodiments of the present invention can also be implemented as corresponding sub-units of the parameter determining device according to one or more example embodiments of the present invention or of the multimodal imaging system according to one or more example embodiments of the present invention. Conversely, the features and advantages described in connection with the parameter determining device according to one or more example embodiments of the present invention or the multimodal imaging system according to one or more example embodiments of the present invention can also be implemented as corresponding steps of the methods according to one or more example embodiments of the present invention.

BRIEF DESCRIPTION OF THE DRAWINGS

One or more example embodiments of the present invention will now be explained again in more detail using exemplary embodiments and with reference to the accompanying drawings in which.

DETAILED DESCRIPTION

Figure 1:
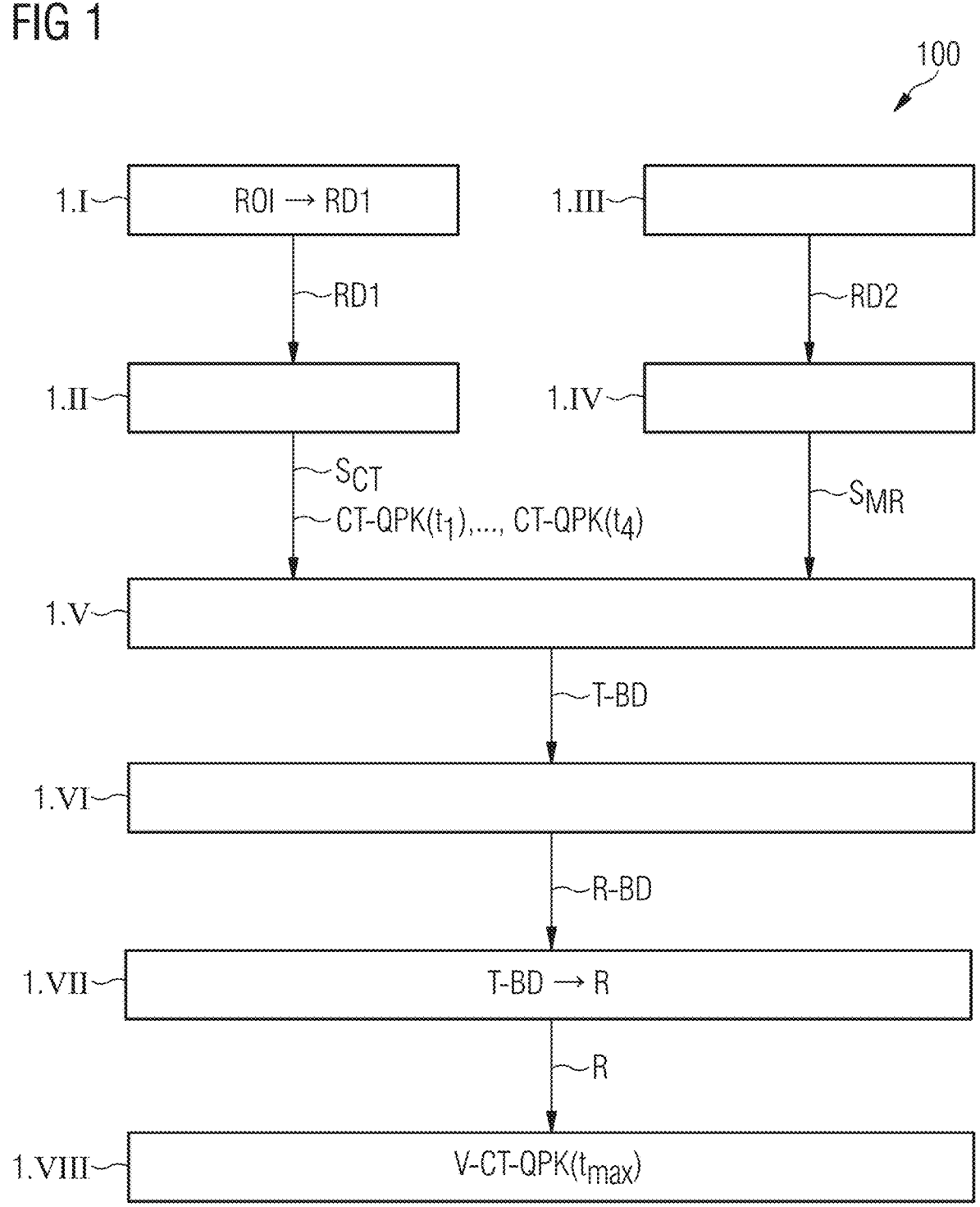
FIG. 1 shows a flowchart illustrating a method for acquiring a quantitative result CT parameter map of a region of interest of an object under examination according to an exemplary embodiment of the invention, FIG. 2 schematically illustrates signal intensity curves at different positions in the region of interest for 4D MRI, FIG. 3 schematically illustrates a CT attenuation value curve obtained based on spectral multiphase CT imaging and the signal intensity curve of the 4D MRI shown in FIG. 2, and an extrapolated iodine concentration value for the point in time of maximum blood flow, FIG. 4 schematically illustrates a region of interest comprising a human liver, FIG. 5 schematically illustrates a parameter determining device according to an exemplary embodiment of the invention, and FIG. 6 schematically illustrates a medical imaging system according to an exemplary embodiment of the invention.

In the method according to one or more example embodiments of the present invention for determining a quantitative result CT parameter map in a region of interest of an object under examination, a sequence of quantitative input CT parameter maps for predetermined points in time is imported. The predetermined points in time are in a defined or predetermined time range which is defined by the measurement on which generation of the quantitative input CT parameter maps is based. The measurement involves spectral multiphase CT with which the sequence of quantitative input CT parameter maps of the region of interest was generated in a contrast-enhanced manner. As mentioned above, the defined time range comprises points in time or more specifically measurement times predetermined on the basis of the clinical issue, but preferably at least four measurement times which preferably cover the different phases of a perfusion measurement mentioned in the introduction, preferably a perfusion measurement of an organ, in particular a liver perfusion measurement. The method according to one or more example embodiments of the present invention is thus preferably used to evaluate a perfusion measurement.

The term "import" is intended to cover all types of reception of data, in particular reception via a receiving unit in a technical data transmission system comprising, for example, a data transmission unit, such as a data transmission line, a transmitting/receiving system or a data receiving interface. In addition, the term "import" also includes reception of data within a data processing system or a computer program used for evaluating measurement data, in particular raw data and image data. Data is preferably imported from a CT scan unit or a medical database as the source.

A region of interest comprises a body region that can be mapped by medical imaging, in particular multiphase CT and magnetic resonance imaging, preferably of an organ, in particular an area or sub-area of the liver or the brain of a human being. Of particular relevance are the vessels and tissue types of the liver mentioned in the introduction. However, it should be noted that the method can also be applied to body regions other than the liver, e.g. the intestine, the spleen or the brain of an object under examination, in particular of a human or animal.

A quantitative CT parameter map consists of a 2-dimensional or 3-dimensional representation of a location-dependent value of a CT parameter at a predetermined point in time or for a predetermined time interval for a region of interest. A CT parameter relates to a measured variable that can be determined on the basis of CT imaging. A single CT-parameter map could be described as a snapshot of a region of interest.

In particular, CT parameters can include so-called perfusion parameters that quantitatively characterize a perfusion process. Perfusion parameters include a perfusion characterizing measured variable, in particular the location-dependent contrast agent concentration or contrast agent volume, blood flow, blood volume, mean flow time or vessel permeability. The aforementioned measured variables are preferably determined for different tissue types, including a tumor and healthy tissue.

The input CT parameter values, e.g. values reflecting a contrast agent concentration or contrast agent volume, is preferably determined by a base material decomposition method or a method for the reconstruction or calculation of virtual base-material-weighted image data, in particular pseudo-monoenergetic image data. Such a method is known from Alvarez R. E. and Macovski A. "Energy-selective reconstructions in x-ray computed tomography," Phys. Med. Biol. 21, 733-744 (1976).

A particularly suitable method for reconstructing or calculating such reconstructed image data, especially pseudo-monoenergetic image data, is described in K. L. Grant et al. "Assessment of an Advanced Image-Based Technique to Calculate Virtual Monoenergetic Computed Tomographic Images From a Dual-Energy Examination to Improve Contrast-To-Noise Ratio in Examinations Using Iodinated Contrast Media," Investigative Radiology 2014; 00: 00-00.

On the basis of base material decomposition of this kind, individual portions of the image data acquired by spectral multiphase CT can advantageously be used to create the CT parameter maps, in particular the input CT parameter maps. In this way, other CT parameters, such as contrast agent concentration, can be determined in addition to the attenuation of voxels of a CT measurement.

In this context, "contrast-enhanced" is to be understood as meaning that the CT and MRI mentioned below are performed in the presence of a contrast agent and that the contrast agent affects the measured values by its presence. For CT imaging, iodine is preferably used as the contrast agent. On the other hand, contrast agents comprising gadolinium compounds or iron oxides or manganese compounds are preferred for MRI. Generally, in CT imaging, the contrast agent used is a substance that exhibits a sharp increase in absorption for a particular energy value of X-rays (for iodine, it is 33 keV). On the other hand, MRI uses contrast agents that exhibit strong paramagnetism which enables neighboring protons, essentially protons of water, to relax more rapidly. Thus, the contrast agent produces a marked difference in measured values acquired in a region enhanced by the contrast agent compared to measured values acquired in a region not enhanced by the contrast agent.

In this context, "quantitative" is to be understood as meaning that the CT parameter values can be determined on the basis of the acquired measured values in terms of their absolute magnitude. Although it is possible for quantitative parameter values to be determined using a spectral CT measurement, it is not possible with an MRI measurement performed alone or exclusively.

A sequence of contrast-enhanced MRI image datasets is also imported. The sequence includes so-called 4D MRI. 4D MRI is an abbreviation for "four-dimensional magnetic resonance imaging." 4D MRI reproduces a time-varying region of interest in a defined or predetermined time range via a sequence of MRI image datasets, each of which could be described as a snapshot. The term frame is also often used for these snapshots. Compared to the sequence of quantitative input CT parameter maps, the sequence of contrast-enhanced MRI image datasets has a higher temporal resolution down to the sub-second range for the entire region of interest, preferably the entire liver. That is to say, preferably one MRI image dataset and, with particular preference, more than one MRI image dataset is generated per second. By applying motion correction techniques, data with a high temporal and spatial resolution can thus be acquired over an entire perfusion cycle, preferably over an entire liver perfusion cycle. Motion correction is particularly useful for regions of interest or organs that are moving, e.g. in the trunk region of a patient.

Higher temporal resolution is to be understood as meaning that a higher number of MRI image datasets than CT parameter maps are acquired in the same defined time range.

Preferably, 4 CT parameter maps are acquired in the predefined time range. Then, a larger number of image datasets than in the case of CT are acquired in the defined time range using the above technique, i.e. 4D MRI. The higher the sampling rate or scan rate selected, the more precisely the different effects during flow contrast agent inflow and outflow can be represented.

Thus, the sequence of contrast-enhanced MRI datasets contains a higher number of image datasets than the sequence of quantitative input CT parameter maps. The sequence of contrast-enhanced MRI datasets is preferably received from an MRI system or MRI scan unit or from a medical database as a source. The sequence of contrast-enhanced MRI image datasets relates to the same time range as that defined for acquisition of the quantitative result CT parameter map, i.e. the time range covered by the sequence of contrast-enhanced MRI datasets includes in particular the at least two predetermined points in time. As imaging using the different modalities cannot usually be performed simultaneously, the defined time period must be equalized between the two modalities. For example, the start of the respective imaging process is determined for this purpose and, if necessary, a temporal normalization is also determined in order to be able to perform correct temporal assignment of the image datasets/CT parameter maps of the different modalities to each other. Correct temporal assignment means that the two datasets (in each case an image dataset and an assigned CT parameter map) have been acquired in the same phase of the inflow or outflow of the respective contrast agent. For example, contrast agent injection can be used in each case as the starting point of the respective imaging, i.e. of the defined time range. If, due to changed circumstances, a different inflow behavior or a different inflow rate of the respective contrast agent occurs, this must be detected and temporal normalization of the time ranges used for the respective imaging, i.e. generation of a CT parameter map, must take place in order to be able to perform correct temporal assignment of the respective image datasets/CT parameter maps of the different measurements to each other. For example, in the case of a different cardiac output during imaging with different modalities, temporal fitting or normalization can be performed by equalizing the quotient ratio of relative signal intensity values in afferent and efferent vessels for a region of interest, in particular an organ, preferably the liver, with a quotient ratio of the CT parameters or more specifically CT parameter values of the CT parameter maps. When taking the quotients, corresponding times or phases of the measurements of different modalities are where the quotients for different modalities assume the same value. A modality shall be understood as meaning a specific type of imaging system, i.e. in particular a CT system or an MRI system, the two being fundamentally different technically.

The contrast-enhanced MRI image datasets also show the region of interest of the object under examination that was acquired by spectral multiphase CT. As described in detail below, the sequences of MRI image datasets represent location-dependent signal intensity variations over time, i.e. time-dependent signal intensity values in the region of interest.

In addition, a relation between the MRI image datasets and the quantitative input CT parameter maps is determined based on the sequence of quantitative input CT parameter maps and the sequence of contrast-enhanced MRI datasets. The relation is to be understood as being a quantitative mathematical relationship between the signal intensity values of the MRI image datasets and the CT parameter values of the quantitative input CT parameter maps, which relationship can be used to convert between the differently generated measurement data.

In detail, the relation is determined as a mathematical relationship between the time- and location-dependent signal intensity values of the MRI image datasets assigned to the quantitative input CT parameter maps and the CT parameter values of these quantitative input CT parameter maps at respectively identical positions, i.e. mutually assigned positions or, more specifically, mutually assigned pixel or voxel positions of the MRI image datasets and CT parameter maps. As will be explained in detail later, the pixel/voxel positions of the image datasets/parameter maps from different modalities can be assigned to each other by registration or more specifically image registration.

The relation, preferably a functional relationship, may itself comprise one or more parameters determined on the basis of parameter values and signal intensity values of voxels of the MRI image datasets and input CT parameter maps temporally and spatially assigned to each other. The temporal assignment has been described in detail above. As will be explained in detail later, spatial assignment can be accomplished by registration, in particular image registration, of the MRI image datasets and input CT parameter maps assigned to each other.

In the simplest case, the relation comprises the calculation rule that the signal intensity values of the MRI image datasets are converted into the (temporally and spatially assigned) CT parameter values, if necessary after temporal normalization, by adding an offset value.

The relation preferably describes at least one linear relationship. This relationship can be assumed under the premise that, in different modalities, the intravasally applied contrast agents have identical pharmacokinetics or, via temporal normalization, comparable pharmacokinetics and that a signal intensity value of an MR image dataset behaves linearly with respect to the concentration of a contrast agent present.

A change in the measured signal intensity values of the MR image datasets is then proportional to a change in the contrast agent volume present in the region of interest during multiphase CT at the same point in time or assigned point in time of the different measurements of the different modalities. Thus, quantitative measurements of spectral multiphase CT can be assigned to a relative change in signal intensity in the MRI image datasets. This applies even if the signal intensity values of the MRI image datasets change between two consecutive 4D MRI scans with the same contrast dynamics. In this case, the relation changes, but not the fundamental property that the change in the measured signal intensity values of the MRI image datasets is proportional to a change in the amount of contrast agent present in the region of interest at the same or assigned point in time during multiphase CT. As will be discussed later, this fact can also be used to reduce the number of modalities used in the case of repeated examinations.

A problem with the comparability of measurements from different modalities could arise if the perfusion behavior changes over time between different measurements from different modalities. For example, a vessel may become occluded, in which case the other or previous measurement would have to be repeated in order to allow "matching". Matching is to be understood as the transfer of signal intensity values of the sequence of MRI image datasets to the sequence of input CT parameter maps.

Based on the determined relation and the MRI image datasets, a quantitative result CT parameter map is thus determined for at least one additional point in time that is different from the at least two predetermined points in time, i.e. measurement times, of the spectral multiphase CT. Advantageously, the MRI image datasets available with higher temporal resolution are used to increase the temporal resolution at which the CT parameters are measured. This is achieved by determining the relation between the MRI image datasets and the quantitative input CT parameter maps in a kind of calibration which makes it possible to convert the relative values of the MRI image datasets into absolute values of the CT parameters, preferably CT parameters of a perfusion measurement, with particular preference CT parameters indicating a contrast agent concentration, and thus to fill the time gaps of the spectral multiphase CT or rather of the input CT parameter maps generated therefrom.

The disadvantages of the MRI image datasets, namely that they only reflect changes in perfusion-characterizing parameter values but no absolute values, are thus advantageously compensated by combining them with the absolute values of the CT parameters of multiphase CT. On the other hand, the comparatively low temporal resolution of multiphase CT is also compensated by combination with the high-resolution sequence of MRI image datasets. Because of the increased temporal resolution, points in time at which threshold values for the CT parameters are exceeded can advantageously be determined. Such a threshold value can include, for example, a significant iodine concentration or a threshold value of an iodine concentration indicative of pathology.

In the method according to one or more example embodiments of the present invention for acquiring a quantitative result CT parameter map of a region of interest of an object under examination, initial raw data is acquired by contrast-enhanced spectral multiphase CT of the region of interest for at least two points in time within a predetermined time range. Based on the acquired initial raw data, a sequence of at least two quantitative input CT parameter maps is reconstructed for the at least two predetermined points in time.

Second raw data of the region of interest is additionally acquired in the predetermined time range by contrast-enhanced 4D MRI at higher temporal resolution compared to the multiphase CT. Based on the second raw data, a sequence of contrast-enhanced MRI datasets which has a higher temporal resolution than the sequence of quantitative input CT parameter maps is reconstructed.

Finally, the method according to one or more example embodiments of the present invention for acquiring a quantitative result CT parameter map in a region of interest of an object under examination is performed based on the reconstructed sequence of quantitative input CT parameter maps and the reconstructed sequence of MRI image datasets. The method according to one or more example embodiments of the present invention for acquiring a quantitative result CT parameter map of a region of interest of an object under examination shares the advantages of the method according to one or more example embodiments of the present invention for determining a quantitative result CT parameter map in a region of interest of an object under examination. Advantageously, the multimodal measurement generates a kind of augmented sequence of quantitative CT parameter maps providing an increased temporal resolution compared to the sequence of input CT parameter maps. Multimodal measurement is to be understood as meaning a temporally parallel or sequential measurement using at least two different types of medical imaging equipment, preferably a CT system and an MRI system. In this context, the temporally sequential measurement is technically easier to implement. The temporally parallel measurement requires technically complex integration of the two modalities. The advantage of the latter variant is that the measurements of different modalities relate to an identical state of an object under examination or more specifically region of interest, thereby providing good comparability of the measurements of the different modalities and enabling the inventively performed matching to be carried out particularly precisely.

The parameter determining device according to one or more example embodiments of the present invention has an input interface for importing a sequence of quantitative input CT parameter maps generated by contrast-enhanced spectral multiphase CT from a region of interest of an object under examination for at least two predetermined measurement times.

The input interface of the parameter determining device according to one or more example embodiments of the present invention is also used to import a sequence of contrast-enhanced MRI datasets which has a higher temporal resolution compared to the sequence of quantitative input CT parameter maps.

The parameter determining device according to one or more example embodiments of the present invention also incorporates a relation determining unit for determining a relation between the MRI image datasets and the quantitative input CT parameter maps.

The parameter determining device according to one or more example embodiments of the present invention further comprises a parameter determining unit for determining a quantitative result CT parameter map, based on the determined relation and the MRI image datasets, for at least one additional point in time that is different from the at least two predetermined points in time.

The parameter determining device according to one or more example embodiments of the present invention preferably comprises an assignment unit for temporally assigning the MRI image datasets to the associated quantitative input CT parameter maps for the at least two predetermined points in time. The parameter determining device according to one or more example embodiments of the present invention preferably also comprises a registration unit for spatially assigning the temporally assigned quantitative input CT parameter maps and MRI image datasets via image registration. Such image registration can involve rigid image registration or elastic image registration, depending on the nature of the object under examination. Registration is to be understood as mapping two images or volumes (in this case, an MRI image and a CT parameter map) to each other as accurately as possible. This requires a geometric transformation. Registration is termed rigid image registration if it includes only translations and rotations as image transformations. Elastic or deformable or flexible registration also includes the mapping of straight lines to curves.

Methods for image registration are described, for example, in Nadine Spahr et al, "Multimodal image registration for liver radioembolization planning and patient assessment," International Journal of Computer Assisted Radiology and Surgery, 14, 215-225 (2019).

The MRI image datasets assigned to the at least two predetermined points in time of the multiphase CT and the quantitative input CT parameter maps assigned thereto are used by the relation determining unit to determine a relation between the MRI image datasets and the quantitative input CT parameter maps. This is possible because a unique assignment between voxels of individual MRI image datasets and voxels or pixels of the CT parameter maps is already achieved by the temporal assignment and registration.

The parameter determining device according to one or more example embodiments of the present invention shares the advantages of the method according to one or more example embodiments of the present invention for determining a quantitative result CT parameter map in a region of interest of an object under examination.

The multimodal imaging system according to one or more example embodiments of the present invention comprises a CT system for acquiring a sequence of contrast-enhanced quantitative input CT parameter maps of a region of interest of an object under examination.

Also part of the multimodal imaging system according to one or more example embodiments of the present invention is an MRI system for acquiring a sequence of contrast-enhanced MRI datasets of the region of interest.

The multimodal imaging system according to one or more example embodiments of the present invention also comprises a parameter determining device according to one or more example embodiments of the present invention for determining a result CT parameter map based on the sequence of quantitative input CT parameter maps and the sequence of MRI image datasets. The multimodal imaging system according to one or more example embodiments of the present invention shares the advantages of the method according to one or more example embodiments of the present invention for determining a quantitative result CT parameter map in a region of interest of an object under examination.

The majority of the aforementioned components of the parameter determining device can be implemented entirely or partly in the form of software modules in a processor of a corresponding computing system, e.g. by a control device of a multimodal medical imaging system or a computer used to control such a system. The advantage of a largely software-based implementation is that computing systems already in use can also be easily upgraded by a software update to operate in the manner according to one or more example embodiments of the present invention. In this respect, the object is also achieved by a corresponding computer program product comprising a computer program directly loadable into a computing system and having program sections for carrying out the steps of the method according to one or more example embodiments of the present invention for determining a quantitative result CT parameter map in a region of interest of an object under examination, and the steps, in particular the reconstruction steps, of the method for acquiring a quantitative result CT parameter map of a region of interest of an object under examination when the program is executed in the computing system. As well as the computer program, such a computer program product can include, where required, additional features such as documentation, and/or additional components, including hardware components such as hardware keys (dongles, etc.) for using the software.

A computer-readable medium, e.g. a memory stick, a hard disk or other portable or permanently installed data carrier containing the computer program sections that can be read in and executed by a computing system can be used for transfer to the computing system or the control device and/or for storage on or in the computing system or control device. The computing system may, for example, have one or more cooperating microprocessors or the like for this purpose.

The dependent claims and the following description each contain particularly advantageous embodiments and further developments of the invention. In particular, the claims of one claim category can also be further developed analogously to the dependent claims of another claim category. Moreover, the various features of different exemplary embodiments and claims can also be combined to form new exemplary embodiments within the scope of the invention.

In the method according to one or more example embodiments of the present invention for determining a quantitative result CT parameter map in a region of interest of an object under examination, the step of determining the relation preferably comprises a step of temporally assigning the MRI image datasets to the input CT parameter maps for the at least two predetermined points in time. As previously indicated, the temporal assignment can be based on the start time of contrast agent administration of the two medical imaging sequences generated using different modalities. In addition, temporal normalization between the two sequences can be performed to ensure correct temporal assignment. Such normalization takes into account the different flow rates of the contrast agent during imaging with the different modalities. Determination of temporal incoherence of this kind as well as corresponding temporal normalization can take place, for example, on the basis of measured values at different positions and for both modalities in the object under examination by taking the quotient of the measured values for different positions as well as by comparing the quotients of image datasets and CT parameter sets of the different modalities and associating image datasets and CT parameter sets having quotients that are as close to each other as possible or rather whose values are closest to each other.

The step of determining the relation also preferably includes a step of relative spatial assignment of the temporally assigned quantitative input CT parameter maps and MRI image datasets to each other for the at least two predetermined points in time via image registration. Relative spatial assignment is to be understood as meaning that spatial or local assignment of both the quantitative input CT parameter maps to the MRI image datasets temporally assigned thereto and, conversely, spatial or local assignment of the MRI image datasets to the quantitative input CT parameter maps temporally assigned thereto can be performed.

The step of determining the relation additionally comprises the step of determining the relation between the MRI image datasets and input CT parameter maps temporally and spatially assigned to each other. As mentioned before, this relation is determined by a kind of matching of the signal intensity values of the MRI image datasets and the CT parameter values of the associated input CT parameter maps. Advantageously, prior to determination of the relation between MRI image datasets and input CT parameter maps, temporal and spatial deviations between the imaging/acquisitions of parameter maps of the different modalities is compensated by the temporal matching and image registration, so that the accuracy in determining the relation is increased.

In a variant of the method according to one or more example embodiments of the present invention for determining a quantitative result CT parameter map in a region of interest of an object under examination, determining the relation involves a ratio between first CT parameter values of the input CT parameter maps and signal intensity values of the MRI image datasets temporally and spatially assigned to the input CT parameter maps.

Figuratively speaking, a kind of projection of the MRI image datasets onto the quantitative input CT parameter maps takes place. Advantageously, the temporally higher-resolution sequence of MRI image datasets is projected onto the sequence of quantitative input CT parameter maps or rather a kind of matching therewith is performed, wherein the parameter values of the input CT parameter maps or parameter values derived therefrom are used as interpolation nodes, so that the relative information or qualitative information of the MRI image datasets is converted into quantitative information of the CT parameters. In particular, the matching involves temporal normalization of the MRI image datasets to the input CT parameter maps.

With particular preference, the quantitative result CT parameter map is determined at the at least one additional point in time by extrapolation or interpolation based on the predetermined point in time and on the determined relation. In this context, extrapolation or interpolation is to be understood as meaning that the CT parameter values are used as interpolation values and the projected MRI image datasets are used as an extrapolation function to determine additional result CT parameter values.

The absolute value or result CT parameter value at the predetermined point in time, e.g. a time of a result CT parameter maximum, is determined by using the CT parameter values from the quantitative input CT parameter maps as interpolation values. Advantageously, a prominent value, e.g. a maximum value of a CT parameter, can be determined particularly precisely. If a value of a parameter is to be determined which is different from the parameter type of the input CT parameter map, it can be determined on the basis of the determined result CT parameter value and an already known mathematical relationship between the result CT parameter value and the parameter value differing therefrom.

For example, if the input CT parameters comprise so-called CT attenuation values, based on knowledge of the difference between the CT attenuation values and the attenuation values assigned to a contrast agent concentration, which values can be calculated in each case for the at least two points in time by base material decomposition, an associated value of the contrast agent concentration, in particular an iodine concentration for the at least one additional point in time, can also be calculated by subtracting this difference from the CT attenuation value calculated as the result parameter value. Advantageously, parameter values of different types can therefore be determined based on the matching once it has been performed.

Determining the quantitative result CT parameter map preferably comprises the steps of determining the at least one additional point in time based on the MRI image datasets. The higher resolution sequence of MRI image datasets allows prominent points in time in the examination, such as the time of a CT parameter maximum, to be more accurately detected or located.

With particular preference, the at least one additional point in time comprises a point in time at which, based on the MRI image datasets, a maximum CT parameter value, preferably a CT parameter value characterizing a perfusion, with most particular preference a maximum contrast agent concentration value, is to be expected in the region of interest. Advantageously, the at least one additional point in time at which the maximum CT parameter value occurs is determined more accurately on the basis of the MRI image datasets than solely on the basis of the temporally lower-resolution quantitative input CT parameter maps.

Moreover, based on the additional knowledge of the relation between the MRI image datasets and the quantitative input CT parameter maps, the wanted maximum CT parameter value, preferably a parameter of a CT perfusion measurement, with particular preference a maximum contrast agent concentration, is determined more accurately than solely on the basis of the quantitative input CT parameter maps.

In a particularly preferred variant of the method according to one or more example embodiments of the present invention for determining a quantitative result CT parameter map in a region of interest of an object under examination, the input CT parameter maps and the result CT parameter map provide parameter values comprising one of the following CT parameter value types:
- a time- and location-dependent normalized attenuation value,
- a time-, location- and energy-dependent attenuation value,
- a time- and location-dependent density value,
- a time- and location-dependent contrast agent concentration value,
- a value indicating a time- and location-dependent contrast agent volume,
- a value indicating a time- and location-dependent blood volume.

A normalized attenuation value comprises a value representing a location-dependent X-ray absorption normalized to attenuation coefficients of water and air. Such a value is often referred to as an HU value.

An energy-dependent attenuation value is acquired during spectral CT imaging for a specific X-ray spectrum having a specific energy.

A density value is determined on the basis of spectral CT imaging and on the basis of the aforementioned base material decomposition by determining pseudo-monochromatic image data.

With particular preference, a contrast agent concentration is determined as a density. With most particular preference, the contrast agent comprises an iodine-based contrast medium. Advantageously, perfusion processes can be made visible by the contrast agent in body structures and evaluated quantitatively. In this particularly preferred variant, quantitative input CT parameter maps, quantitative contrast agent maps or contrast agent concentration maps, with most particular preference quantitative iodine maps or iodine concentration maps, are used. As a result, contrast agent maps, in particular iodine maps with increased temporal resolution, are then obtained on the basis of multimodal imaging. The amount of contrast agent, especially at a time of maximum contrast agent volume, indicates the site-dependent blood flow in a region of interest.

It should be re-emphasized at this juncture that the input CT parameter maps and/or the result CT parameter map preferably reflect a distribution of at least one perfusion parameter. As mentioned above, this perfusion parameter can usually be determined on the basis of contrast agent distribution. As already mentioned, perfusion parameters include a perfusion-characterizing measured variable, in particular one of the following variables, comprising location-dependent contrast agent concentration or contrast agent volume, blood flow, blood volume, mean flow time, or vessel permeability. Advantageously, the gain in temporal resolution compared to a monomodal approach enables more accurate imaging and analysis of perfusion behavior in a region of interest.

In a particularly preferred variant of the method according to one or more example embodiments of the present invention for determining a quantitative result CT parameter map, the quantitative result CT parameter map generated is used for determining a pharmacokinetic model. Advantageously, such a pharmacokinetic model, which simulates the dynamics of transport of a pharmaceutical substance in an object under examination and is used, for example, to determine the time of maximum contrast agent concentration in a region of interest of the object under examination, can be made more precise.

With most particular preference, in the method according to one or more example embodiments of the present invention for determining a quantitative result CT parameter map, a plurality of quantitative result CT parameter maps are generated on the basis of the determined relation and the MRI image datasets. Advantageously, the resolution of the resulting augmented sequence of quantitative CT parameter maps can be further increased because of the increased number of CT parameter maps obtained.

Consequently, a sequence of CT parameter maps with high temporal resolution can be generated based on the determined relation and the MRI image datasets. A sequence of CT parameter maps with high temporal resolution preferably comprises at least one CT parameter map per half second, with particular preference at least one CT parameter map per second.

With particular preference, based on knowledge of the relation and/or the high-resolution sequence of CT parameter maps, a monomodal examination is performed, preferably a follow-up examination. In this type of examination, only a single scan is performed using either a CT system or an MRI system and the missing information is supplemented by the known relation and/or the known high-resolution sequence data. Figuratively speaking, therefore, an estimate for the other modality can be determined for both a future CT measurement and a future MRI measurement, so that only a single modality needs to be used. Advantageously, in the case of more frequently occurring examinations, in particular follow-up examinations, effort, time and resources can be saved and the impact on the patient, in particular their radiation exposure, can be reduced.

One form of frequently recurring examinations are follow-up examinations designed to document a state of health, e.g. tumor dynamics or response of a tumor to therapy, on a regularly recurring basis.

With particular preference, the relation is determined based on the premise that intravasally applied contrast agents in the CT measurement have identical pharmacokinetics to intravasally applied contrast agents in the MRI measurement and that the changes in signal intensity in the MRI measurement are subject to a certain linearity depending on the concentration of the contrast agents, so that the change in the measured signal intensity values in the MRI measurement can be equated with the amount of contrast agent in the CT measurement at one of the predetermined points in time. On the basis of the MRI measurement, the contrast agent concentration values determined on the basis of the CT measurement can advantageously be used as interpolation values to determine further contrast agent concentration values which are assigned to other points in time and thus increase the temporal resolution of a contrast agent concentration measurement.

In FIG. 1, a flowchart 100 is shown illustrating a method for acquiring a quantitative result CT parameter map V-CT-QPK(tmax) of a region of interest ROI of an object under examination O.

In step 1.I, first raw data RD1 is acquired by contrast agent enhanced spectral multiphase CT of the region of interest ROI for predetermined points in time t1, t2, t3, t4. Iodine is used as the contrast agent in spectral multiphase CT. The acquisition of the raw data RD1 is spectrally resolved, so that a contrast agent concentration in the region of interest ROI can be determined as a CT parameter.

In step 1.II, a sequence SCT of quantitative input CT parameter maps CT-QPK(t1), . . . , CT-QPK(t4) is reconstructed based on the acquired first raw data RD1 for the predetermined points in time t1, t2, t3, t4. These input CT parameter maps CT-QPK(t1), . . . , CT-QPK(t4) preferably each represent a location-dependent distribution of a contrast agent at the predetermined points in time t1, t2, t3, t4. The predetermined points in time t1, t2, t3, t4 correspond to the different phases of a perfusion measurement as explained in the introduction and also mentioned again in connection with FIG. 4.

In step 1.III, contrast-enhanced acquisition of second raw data RD2 of the region of interest ROI is performed by four-dimensional magnetic resonance imaging with higher temporal resolution compared to multiphase CT. The preferred contrast agent used in 4D MRI is a gadolinium compound. Alternatively, iron oxide compounds or manganese-based compounds are also used.

In addition, in step 1.IV, a sequence SMR of contrast-enhanced MRI datasets BD(t), which has a higher temporal resolution compared to the sequence SCT of quantitative input CT parameter maps CT-QPK(t1), ..., CT-QPK(t4), is reconstructed based on the second raw data RD2. The MRI image datasets BD(t) each show location-dependent signal intensity values SI (see FIG. 2) at different points in time.

Subsequently, in steps 1.V to 1.VIII, the method according to one or more example embodiments of the present invention is performed to determine a quantitative result CT parameter map V-CT-QPK(tmax) in a region of interest ROI of an object under examination O.

In step 1.V, temporal assignment of the 4D MRI image datasets BD(t) to the predetermined points in time t1, t2, t3, t4 of the multiphase CT is performed, wherein MRI image data T-BD temporally assigned to the predetermined points in time t1, t2, t3, t4 is generated.

In step 1.VI, the quantitative input CT parameter maps CT-QPK(t1), ..., CT-QPK(t4) and MRI image data T-BD temporally assigned to each other are spatially assigned by image registration, wherein MRI image data R-BD registered with the quantitative input CT parameter maps CT-QPK(t1), ..., CT-QPK(t4) is generated.

In step 1.VII, on the basis of the registered MRI image data R-BD and the quantitative input CT parameter maps CT-QPK(t1), ..., CT-QPK(t4), a relation R is determined between the time- and location-dependent signal intensity values SI of the MRI image data R-BD registered with the quantitative input CT parameter maps CT-QPK(t1), ..., CT-QPK(t4) and the CT parameter values, e.g. attenuation values, each temporally assigned to the signal intensity values SI by the registration, of the quantitative input CT parameter maps CT-QPK(t1), ..., CT-QPK(t4) each temporally assigned to the registered MRI image data R-BD.

In step 1.VIII, a quantitative result CT parameter map V-CT-QPK(tmax) is determined based on the determined relation R and the sequence SMR of 4D MRI image datasets BD(t) for at least one additional point in time tmax that is different from the predetermined points in time t1, t2, t3, t4 of the multiphase CT.

Figure 2:
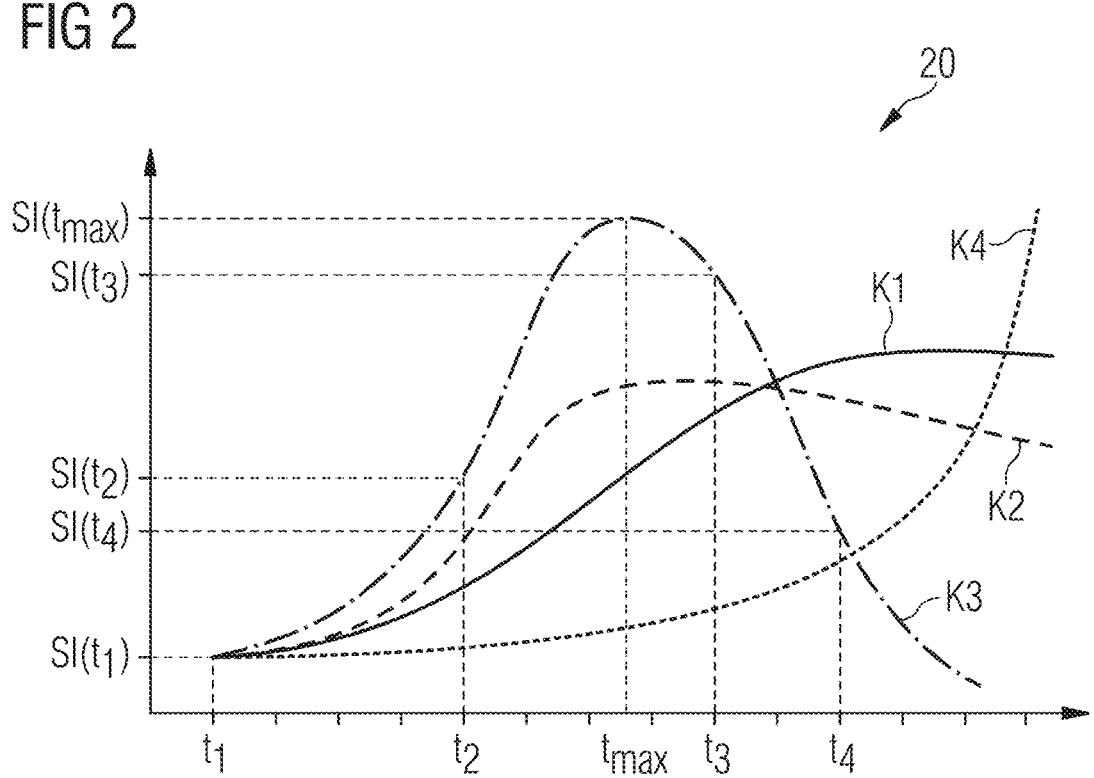
Figure 4:
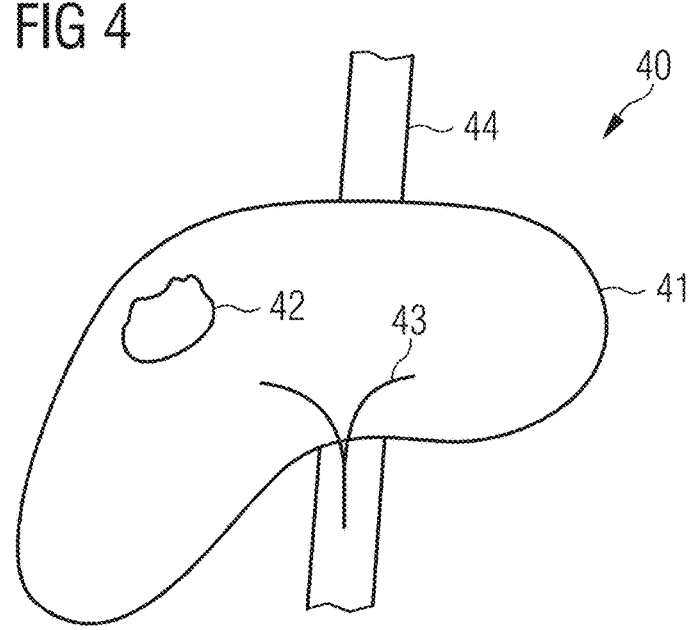

FIG. 2 shows a schematic diagram 20 of signal intensity curves K1, K2, K3, K4 at different positions in the region of interest for a 4D MRI scan. The different signal intensity curves K1, K2, K3, K4 correspond to contrast agent concentrations at positions 41, 42, 43, 44 as of a patient's liver as shown in FIG. 4.

A first position 41 corresponds to a general localization of the liver, a second position 42 corresponds to a localization of a tumor, a third position 43 corresponds to the localization of the hepatic artery, and a fourth position 44 corresponds to the localization of the vena cava.

The first signal curve K1 also corresponds to a measurement in the native phase, the second signal curve K2 to a measurement in the arterial phase, the third signal curve K3 to a measurement in the portal venous phase, and the fourth signal curve K4 corresponds to a measurement in the late e.g. venous phase.

The third curve K3 is usually used to observe tumor behavior. For the third curve, a plurality of snapshots are taken at different times, in particular at the times t1, t2, tmax, t3 and t4.

The associated signal intensity values SI(t1), SI(t2), SI(tmax), SI(t3) and SI(t4) are also acquired. It should be mentioned at this juncture that 4D MRI is high-resolution and MRI image data is acquired for a plurality of additional points in time in addition to the aforementioned times t1, t2, tmax, t3, and t4, so that the continuously drawn curve K3 is representative.

Figure 3:
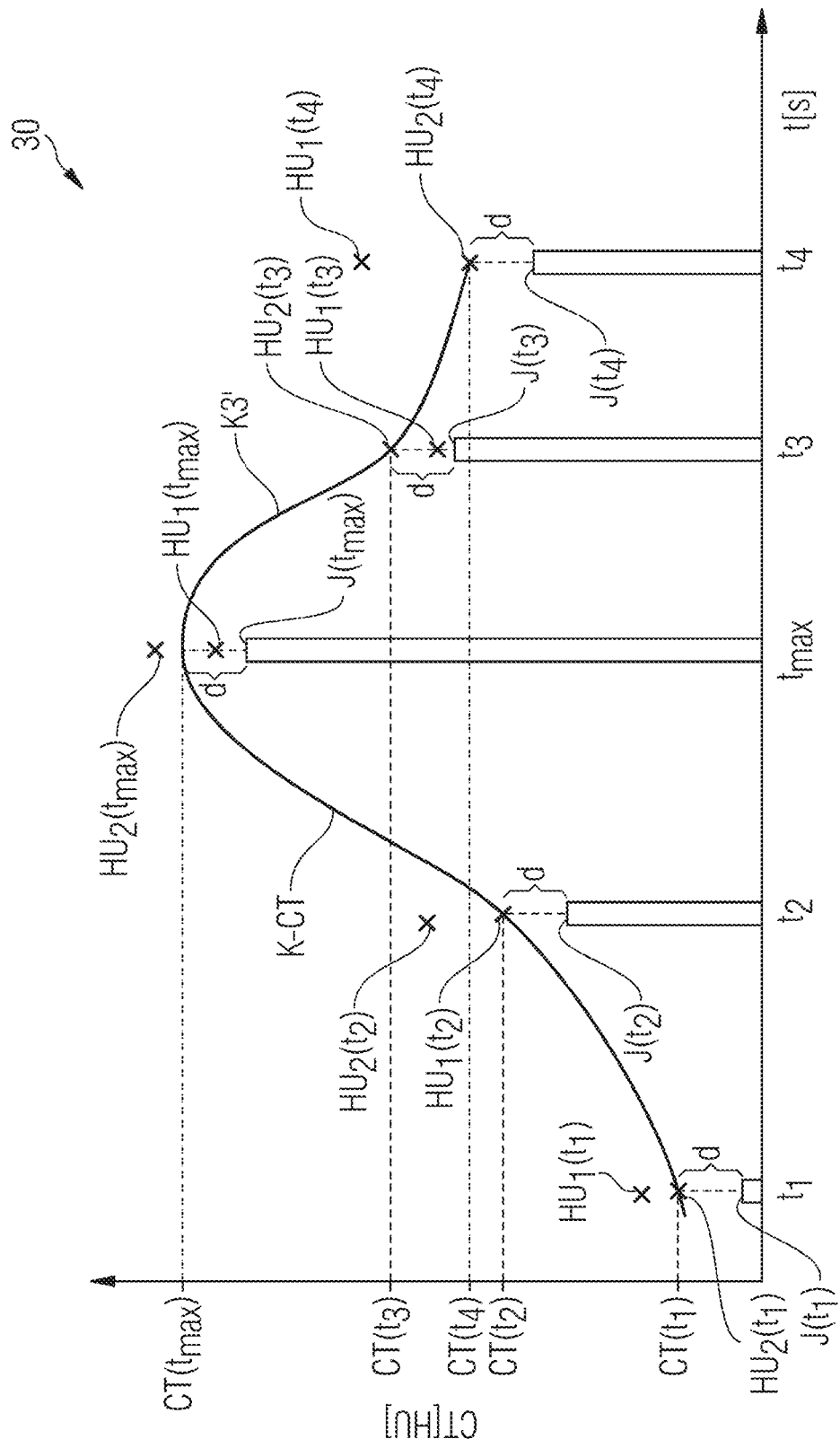

FIG. 3 shows a schematic diagram 30 of a CT attenuation value curve K-CT that was determined based on spectral multiphase CT imaging and the 4D MRI signal intensity curve K3 shown in FIG. 2, and an extrapolated iodine concentration value J(tmax) for time tmax of maximum blood flow.

Attenuation values CT(t1,), CT(t2), CT(t3), CT(t4) determined by said spectral multiphase CT lie on the CT attenuation value curve K-CT. The attenuation values CT(t1,), CT(t2), CT(t3), CT(t4) are derived from attenuation values of a spectral measurement or a dual-energy measurement for a first energy E1: HU1($t1$,), HU1($t2$), HU1($t3$), HU1($t4$) and a second energy E2: HU2($t1$,), HU2($t2$), HU2($t3$), HU2($t4$). Attenuation values J(t1,), J(t2), J(t3), J(t4) assigned to an iodine concentration or iodine quantity can also be calculated from the spectral measurement values via the base material decomposition method referred to several times above and by determining pseudo-monoenergetic image data. The curve K-CT of attenuation values determined on the basis of spectral multiphase CT as well as 4D MRI was obtained by matching between the attenuation values CT(t1,), CT(t2), CT(t3), CT(t4) of the spectral multiphase CT and the curve K3 of a 4D MRI shown in FIG. 2.

Figuratively speaking, the signal intensity curve K3 is fitted to the attenuation values CT(t1,), CT(t2), CT(t3), CT(t4) at the four points in time t1, t2, t3, and t4 for which an iodine concentration was also determined by spectral multiphase CT in each case.

The fitting can be performed, for example, by the following calculation rule $$CT(tk) = a * SI(tk) + b, (k=1, \ldots, 4) \text{ and}$$

by determining the parameters a and b using the least squares method. In the best case, the parameter a has the value 1 and, figuratively speaking, the curve K3 is only shifted in the direction of the ordinate.

On the basis of the determined parameters, an attenuation value curve K-CT(tk) can then be determined, wherein k can now assume further values in addition to the values 1 to 4, i.e. the resolution of the curve K-CT is now higher than only according to the four measured values acquired by the spectral CT measurement.

Based on this curve K-CT(tk), a maximum attenuation value CT(tmax) at which maximum contrast agent concentration in the hepatic artery is also to be expected can now also be read, as shown in FIG. 3.

In addition, based on knowledge of the difference d between the CT attenuation values CT(t1,), CT(t2), CT(t3), CT(t4) and the attenuation values J(t1,), J(t2), J(t3) J(t4) associated with a contrast agent concentration, which can be calculated for the four points in time t1, t2, t3 and t4 by base material decomposition, an associated value of the contrast agent concentration, in particular an iodine concentration J(tmax) can also be calculated. In this case, the difference d is simply subtracted from the CT attenuation value CT(tmax) at the time tmax of maximum perfusion.

Thus, the time tmax of maximum contrast agent concentration can be read from the fitted curve K-CT(tk) and contrast agent concentration values and, in particular, a maximum contrast agent concentration value J(tmax) or maximum contrast agent volume in the hepatic artery can be calculated.

FIG. 4 shows a schematic representation 40 of a region of interest comprising a human liver 41.

In the representation shown in FIG. 4, the human liver 41 contains a tumor 42 shown at upper left of the liver 41. In addition, the liver 41 is supplied with fresh blood by the hepatic artery 43. The hepatic artery 43 is shown in the center of the liver 41. Visible in the background, i.e. partially obscured by the liver 41 and running vertically in FIG. 4, is the vena cava 44.

Figure 5:
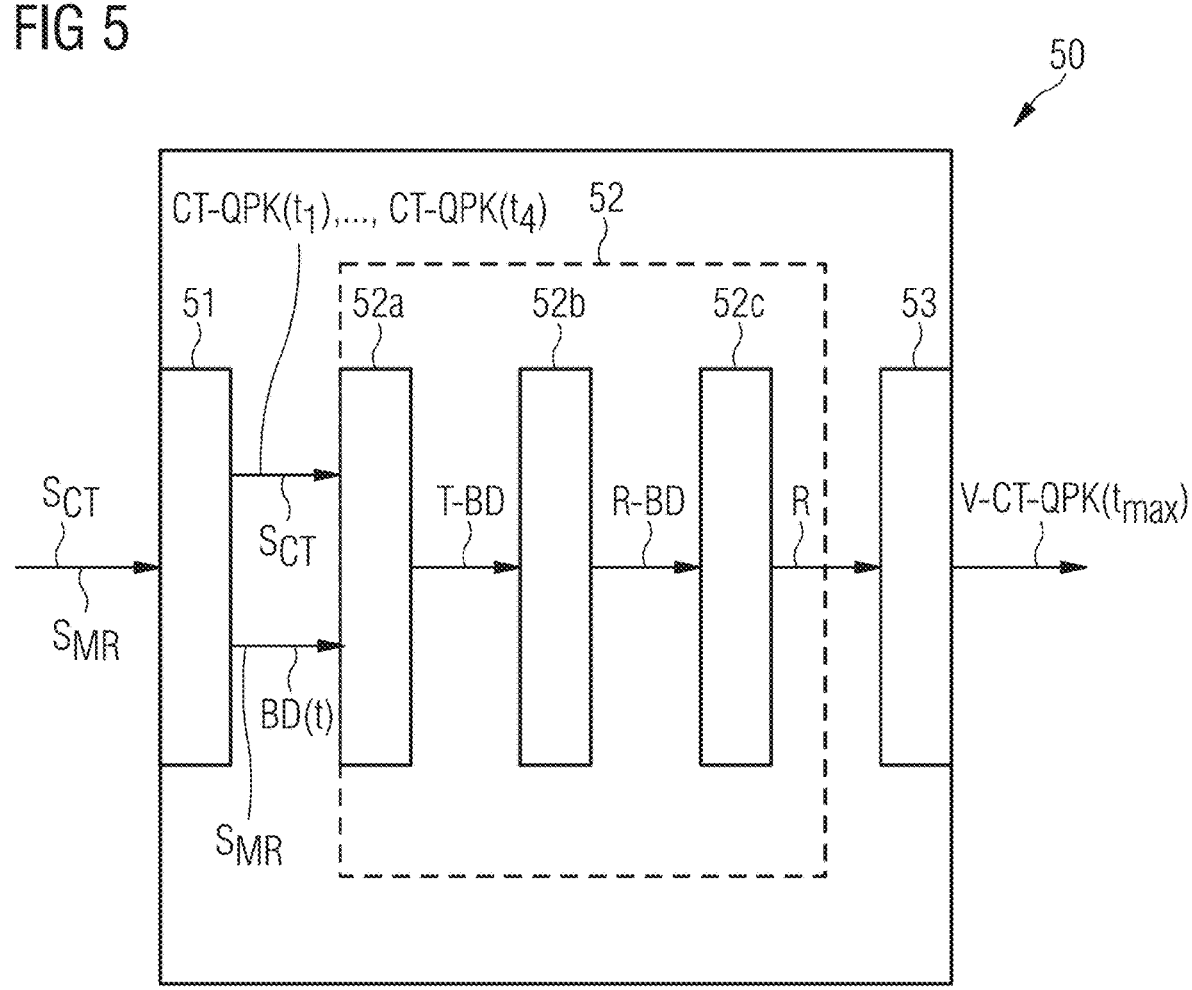

FIG. 5 schematically illustrates a parameter determining device 50 according to an exemplary embodiment of the invention.

The parameter determining device 50 comprises an input interface 51. The input interface 51 is designed to receive a sequence SCT of quantitative input CT parameter maps CT-QPK(t1), ..., CT-QPK(t4) of a region of interest ROI of an object under examination O which have been generated by contrast-enhanced spectral multiphase CT for predetermined points in time t1, t2, t3, t4.

The input interface 51 is also designed to receive a sequence SMR of contrast-enhanced MRI datasets BD(t) which has a higher temporal resolution compared to the sequence SCT of quantitative input CT parameter maps CT-QPK(t1), ..., CT-QPK(t4).

Also incorporated in the parameter determining device 50 is a relation determining unit 52. The relation determining unit 52 is designed to perform matching between the sequences SMR, SCT acquired by different modalities.

For this purpose, the relation determining unit 52 comprises an assignment unit 52a for temporally assigning the MRI image datasets BD(t) to the predetermined times t1, t2, t3, t4 of the multiphase CT, wherein MRI image data T-BD temporally assigned to the predetermined times t1, t2, t3, t4 is generated.

The relation determining unit 52 also comprises a registration unit 52b for spatially assigning the reconstructed quantitative input CT parameter maps CT-QPK(t1), ..., CT-QPK(t4) and the reconstructed MRI image datasets BD(t) via image registration, wherein MRI image data R-BD registered with the quantitative input CT parameter maps CT-QPK(t1), ..., CT-QPK(t4) is generated.

The relation determining unit 52 further comprises a relation-determining sub-unit 52c for determining a relation R between the signal intensity values of the registered MRI image data R-BD and the CT parameter values of the assigned quantitative input CT parameter maps CT-QPK(t1), ..., CT-QPK(t4). The relation R is determined between the time- and location-dependent signal intensity values SI of the MRI image data R-BD registered with the quantitative input CT parameter maps CT-QPK(t1), ..., CT-QPK(t4) and between the CT parameter values of the pixels or voxels of the input CT parameter maps CT-QPK(t1), ..., CT-QPK(t4) assigned to the registered MRI image data R-BD by spatial assignment in each case, said pixels and voxels having been spatially assigned to the pixels and voxels of the MRI image data by the registration.

Moreover, the parameter determining device 50 comprises a parameter determining unit 53 for determining a quantitative result parameter map V-CT-QPK(tmax) based on the determined relation R and the reconstructed image datasets BD(t) for at least one additional time tmax.

Figure 6:
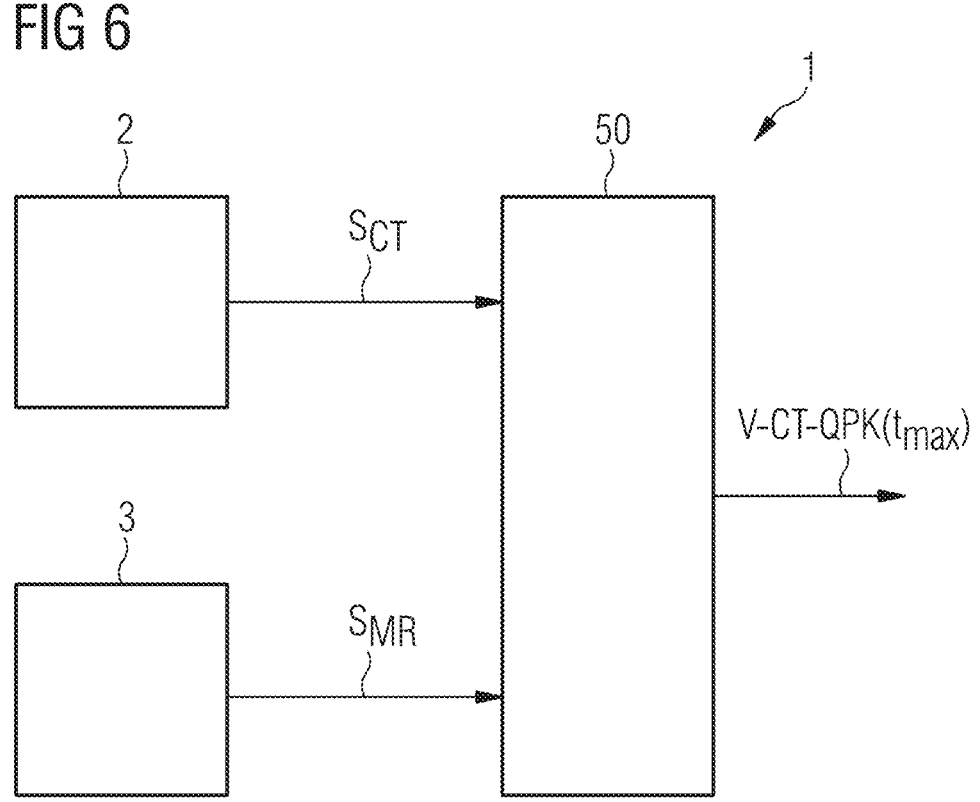

FIG. 6 schematically illustrates a medical imaging system 1 according to an exemplary embodiment of the invention. The medical imaging system 1 comprises a CT system 2, an MRI system 3, and the parameter determining device 50 shown in FIG. 5. The parameter determining device 50 receives from the CT system a sequence SCT of contrast-enhanced quantitative input CT parameter maps CT-QPK(t1), ..., CT-QPK(t4) and from the MR system 3 a sequence SMR of contrast-enhanced MRI datasets BD(t) and generates a result CT parameter map V-CT-QPK(tmax) for an additional point in time tmax as explained in detail in connection with FIGS. 1 to 5.

Finally, it is reiterated that the methods and devices described above are merely preferred exemplary embodiments of the invention and that the invention can be varied by those skilled in the art without departing from the scope of the invention as set forth in the claims. It is also pointed out for the sake of completeness that the use of the indefinite articles "or" or "an" does not exclude the possibility that the features in question may be present more than once. Likewise, the term "unit" does not exclude the possibility that it consists of a plurality of components which may possibly also be spatially distributed.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RA), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium, storage means or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for determining a quantitative result Computed Tomography (CT) parameter map in a region of interest of an object under examination, the method comprising:
   acquiring a sequence of quantitative input CT parameter maps for at least two times, the quantitative input CT parameter maps being generated by contrast-enhanced spectral multiphase CT of the region of interest;
   receiving a sequence of contrast-enhanced Magnetic Resonance Imaging (MRI) image datasets, the contrast-enhanced MRI image datasets having a higher temporal resolution than the quantitative input CT parameter maps;
   determining a relation between the contrast-enhanced MRI image datasets and the quantitative input CT parameter maps; and
   determining the quantitative result CT parameter map based on the relation and the contrast-enhanced MRI image datasets for at least one additional time, the at least one additional time being different from the at least two times.

2. The method of claim 1, wherein the determining the relation comprises:

temporally assigning the contrast-enhanced MRI image datasets to the quantitative input CT parameter maps for the at least two times;

spatially assigning the quantitative input CT parameter maps and the contrast-enhanced MRI image datasets via image registration for the at least two times; and determining the relation between the contrast-enhanced MRI image datasets and the quantitative input CT parameter maps based on the temporally assigning and the spatially assigning.

3. The method of claim 2, wherein the relation includes a ratio between first CT parameter values and signal intensity values, the first CT parameter values being of the quantitative input CT parameter maps, and the signal intensity values being of the contrast-enhanced MRI image datasets temporally and spatially assigned to the quantitative input CT parameter maps.

4. The method of claim 3, wherein the determining the quantitative result CT parameter map comprises performing extrapolation or interpolation based on the first CT parameter values and the relation.

5. The method of claim 1, wherein the at least one additional time is based on the contrast-enhanced MRI image datasets.

6. The method of claim 1, wherein the at least one additional time includes a time at which a maximum CT parameter value is expected in the region of interest based on the contrast-enhanced MRI image datasets.

7. The method of claim 1, wherein at least one of the quantitative input CT parameter maps or the quantitative result CT parameter map indicates a parameter value of at least one CT parameter value type, the at least one CT parameter value type including at least one of:
a normalized attenuation value;
an energy-dependent attenuation value;
a density value; or
a contrast agent concentration value.

8. The method of claim 1, wherein at least one of the quantitative input CT parameter maps or the quantitative result CT parameter map reflects a distribution of at least one perfusion parameter.

9. The method of claim 1, further comprising:
generating a first sequence of CT parameter maps based on the relation and the contrast-enhanced MRI image datasets, the first sequence of CT parameter maps including the quantitative input CT parameter maps and the quantitative result CT parameter map, and the first sequence of CT parameter maps having a higher temporal resolution than the sequence of the quantitative input CT parameter maps.

10. The method of claim 9, further comprising:
performing a monomodal examination based on at least one of the first sequence of CT parameter maps or the relation.

11. A method for acquiring a quantitative result Computed Tomography (CT) parameter map of a region of interest of an object under examination, the method comprising:
contrast-enhanced acquiring first raw data by spectral multiphase CT of the region of interest for at least two times;
reconstructing a sequence of quantitative input CT parameter maps based on the first raw data for the at least two times;
contrast-enhanced acquiring a 4D Magnetic Resonance Imaging (MRI) measurement of second raw data of the region of interest, the 4D MRI measurement having a higher temporal resolution than the spectral multiphase CT;
reconstructing a sequence of contrast-enhanced MRI datasets based on the second raw data, the sequence of contrast-enhanced MRI datasets having a higher temporal resolution than the sequence of quantitative input CT parameter maps; and
performing the method of claim 1 based on the sequence of quantitative input CT parameter maps and the sequence of contrast-enhanced MRI image datasets.

12. A parameter determining device, comprising:
an input interface configured to
import a sequence of quantitative input Computed Tomography (CT) parameter maps for at least two times, the sequence of the quantitative input CT parameter maps being generated by contrast-enhanced spectral multiphase CT, and the quantitative input CT parameter maps being of a region of interest of an object under examination, and
import a sequence of contrast-enhanced Magnetic Resonance Imaging (MRI) image datasets which has a higher temporal resolution than the sequence of the quantitative input CT parameter maps;
a relation determining unit configured to determine a relation between the contrast-enhanced MRI image datasets and the quantitative input CT parameter maps; and
a parameter determining unit configured to determine a quantitative result CT parameter map based on the relation and the contrast-enhanced MRI image datasets for at least one additional time, the at least one addition time being different from the at least two times.

13. A multimodal medical imaging system, comprising:
a CT system configured to acquire the sequence of the quantitative input CT parameter maps;
an MRI system configured to acquire the sequence of the contrast-enhanced MRI image datasets of the region of interest; and
the parameter determining device of claim 12.

14. A non-transitory computer program product comprising instructions which, when executed by a computer, cause the computer to perform the method of claim 1.

15. A non-transitory computer-readable storage medium comprising instructions which, when executed by a computer, cause the computer to perform the method of claim 1.

16. The method of claim 4, wherein the at least one additional time is based on the contrast-enhanced MRI image datasets.

17. The method of claim 16, wherein the at least one additional time includes a time at which a maximum CT parameter value is expected in the region of interest based on the contrast-enhanced MRI image datasets.

18. The method of claim 17, wherein at least one of the quantitative input CT parameter maps or the quantitative result CT parameter map indicates a parameter value of at least one CT parameter value type, the at least one CT parameter value type including at least one of:
a normalized attenuation value;
an energy-dependent attenuation value;
a density value; or
a contrast agent concentration value.

19. The method of claim 18, wherein at least one of the quantitative input CT parameter maps or the quantitative result CT parameter map reflects a distribution of at least one perfusion parameter.

20. The method of claim 19, further comprising:
generating a first sequence of CT parameter maps based on the relation and the contrast-enhanced MRI image datasets, the first sequence of CT parameter maps including the quantitative input CT parameter maps and the quantitative result CT parameter map, and the first sequence of CT parameter maps having a higher temporal resolution than the sequence of the quantitative input CT parameter maps.

21. The method of claim 1, wherein the contrast-enhanced spectral multiphase CT corresponds to a first time range;

the at least two times are in the first time range; and the sequence of the contrast-enhanced MRI image datasets corresponds to the first time range.

* * * * *